United States Patent
Nakayama et al.

(10) Patent No.: US 12,371,109 B2
(45) Date of Patent: Jul. 29, 2025

(54) DEFLECTOR DEVICE

(71) Applicant: KABUSHIKI KAISHA TOKAI-RIKA-DENKI-SEISAKUSHO, Aichi (JP)

(72) Inventors: Daisuke Nakayama, Aichi (JP); Nobuhiro Kudo, Aichi (JP); Kazuya Umino, Aichi (JP); Kazuyuki Yokoyama, Aichi (JP); Toshiya Ito, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 211 days.

(21) Appl. No.: 18/087,182

(22) Filed: Dec. 22, 2022

(65) Prior Publication Data

US 2023/0202585 A1 Jun. 29, 2023

(30) Foreign Application Priority Data

Dec. 24, 2021 (JP) ................................ 2021-211524

(51) Int. Cl.
*B62D 35/00* (2006.01)
*B62D 35/02* (2006.01)

(52) U.S. Cl.
CPC ............ *B62D 35/005* (2013.01); *B62D 35/02* (2013.01)

(58) Field of Classification Search
CPC .... B62D 35/00; B62D 35/001; B62D 35/005; B62D 35/02
USPC .......................................... 296/180.1, 180.3
See application file for complete search history.

(56) References Cited

U.S. PATENT DOCUMENTS

| 10,081,400 | B2* | 9/2018 | Abdoul Azizou ..... B62D 35/02 |
| 10,953,933 | B2* | 3/2021 | Schmitt ................ B62D 35/005 |
| 11,155,312 | B2* | 10/2021 | Shiga .................... B62D 37/02 |
| 2016/0230820 | A1 | 8/2016 | Matthews et al. |
| 2017/0101136 | A1* | 4/2017 | Zielinski ............... B62D 35/02 |
| 2017/0120968 | A1 | 5/2017 | Povinelli et al. |

(Continued)

FOREIGN PATENT DOCUMENTS

| JP | 2016094073 A | 5/2016 |
| JP | 2016-528861 | 9/2016 |

(Continued)

OTHER PUBLICATIONS

Japanese Office Action (w/ English translation) for corresponding Application No. 2021-211524, mailed Nov. 12, 2024, 8 pages.

*Primary Examiner* — Jason S Daniels
(74) *Attorney, Agent, or Firm* — Dority & Manning, P.A.

(57) ABSTRACT

A deflector device having a deflector body that is configured to be deployed in front of a front wheel of a vehicle by being rotated in a deploy direction and to suppress airflow onto the front wheel, and that is configured to be stowed in a body of the vehicle by being rotated in a stow direction; a rotation shaft that is configured to rotate the deflector body by rotation of the rotation shaft; and a transmission member that is configured to transmit drive force to the rotation shaft to rotate the rotation shaft, and to be moved, when an external force has acted on the deflector body such that the deflector body is rotated in the stow direction from a stowed position, by movement of the rotation shaft in an axial direction being limited.

9 Claims, 7 Drawing Sheets

(56) References Cited

U.S. PATENT DOCUMENTS

| | | | |
|---|---|---|---|
| 2017/0355403 | A1 | 12/2017 | Grebel |
| 2018/0298953 | A1 | 10/2018 | Andre et al. |
| 2019/0084628 | A1 | 3/2019 | Povinelli et al. |
| 2019/0152543 | A1* | 5/2019 | Shiga .................... B62D 37/02 |
| 2019/0211892 | A1 | 7/2019 | Matthews et al. |
| 2020/0094889 | A1* | 3/2020 | Shiga ................... B62D 35/005 |
| 2020/0164934 | A1* | 5/2020 | Shiga ................... B62D 35/005 |
| 2020/0189668 | A1 | 6/2020 | Urbach et al. |
| 2020/0386282 | A1 | 12/2020 | Matthews et al. |

FOREIGN PATENT DOCUMENTS

| | | | |
|---|---|---|---|
| JP | 2019093785 A | 6/2019 | |
| JP | 2020090278 A | 6/2020 | |

\* cited by examiner

DEFLECTOR DEVICE

CROSS-REFERENCE TO RELATED APPLICATION

This application claims priority under 35 USC 119 from Japanese Patent Application No. 2021-211524 filed Dec. 24, 2021, the disclosure of which is incorporated by reference herein in its entirety.

BACKGROUND

Technical Field

The present disclosure relates to a deflector device that suppresses airflow onto a front wheel of a vehicle.

Related Art

In a tightly sealed actuator described in Japanese National-Phase Publication No. 2016-528861, a movable detent ring transmits drive force to an output shaft, and a component is rotated between a folded position and a moving position by the output shaft being rotated thereby.

In such a tightly sealed actuator, preferably the output shaft is able to be suppressed from moving in an axial direction when an external force has acted on the component and the component is rotated thereby toward an opposite side of the folded position to the moving position.

SUMMARY

In consideration of the above circumstances, an object of the present disclosure is to obtain a deflector device capable of suppressing a rotation shaft from being moved in an axial direction.

A deflector device of a first aspect of the present disclosure includes a deflector body, a rotation shaft, and a transmission member. The deflector body is configured to be deployed in front of a front wheel of a vehicle by being rotated in a deploy direction and to suppress airflow onto the front wheel, and configured to be stowed in a body of the vehicle by being rotated in a stow direction. The rotation shaft is configured to rotate the deflector body by rotation of the rotation shaft. The transmission member is configured to transmit drive force to the rotation shaft to rotate the rotation shaft, and to be moved when an external force has acted on the deflector body such that the deflector body is rotated in the stow direction from a stowed position, by movement of the rotation shaft in an axial direction being limited.

A deflector device of a second aspect of the present disclosure is the deflector device of the first aspect of the present disclosure, wherein the external force acting on the deflector body such that the deflector body is rotated in the stow direction from the stowed position is smaller than an external force acting on the deflector body such that the deflector body is rotated in the stow direction from the deployed position.

A deflector device of a third aspect of the present disclosure is the deflector device of the first aspect or the second aspect of the present disclosure, wherein the deflector body is restored to the stowed position by an urging force when the deflector body has been rotated in the stow direction from the stowed position by the external force.

A deflector device of a fourth aspect of the present disclosure is the deflector device of any one of the first aspect to the third aspect of the present disclosure, wherein the deflector body is restored to the deployed position by an urging force when the deflector body has been rotated in the stow direction from the deployed position by the external force.

A deflector device of a fifth aspect of the present disclosure is the deflector device of any one of the first aspect to the fourth aspect of the present disclosure, wherein a drive force transmitted to the transmission member to rotate the deflector body is larger than the external force transmitted from the transmission member such that the deflector body is rotated in the stow direction from the stowed position.

A deflector device of a sixth aspect of the present disclosure is the deflector device of any one of the first aspect to the fifth aspect of the present disclosure, wherein the external force acting on the deflector body such that the deflector body is rotated in the stow direction from the stowed position increases in proportion to a rotation amount of the deflector body in the stow direction from the stowed position.

In the deflector device of the first aspect of the present disclosure, the deflector body is rotated by the transmission member transmitting drive force to the rotation shaft and rotating the rotation shaft. Moreover, the deflector body is deployed in front of the front wheel of the vehicle by rotation of the deflector body in the deploy direction, suppressing airflow onto the front wheel. Alternatively, the deflector body is stowed in the vehicle body by the rotation of the deflector body in the stow direction.

When an external force has acted on the deflector body, the transmission member is moved while movement of the rotation shaft in an axial direction of the rotation shaft is limited, such that the deflector body is rotated in the stow direction from the stowed position. This accordingly enables the rotation shaft to be suppressed from being moved in the axial direction.

In the deflector device of the second aspect of the present disclosure, the external force acting on the deflector body such that the deflector body is rotated in the stow direction from the stowed position is smaller than an external force acting on the deflector body such that the deflector body is rotated in the stow direction from the deployed position. This accordingly enables the deflector body to rotate in the stow direction from the stowed position even with a small external force acting on the deflector body.

In the deflector device of the third aspect of the present disclosure, when the deflector body has been rotated in the stow direction from the stowed position by the external force, the deflector body is restored to the stowed position by an urging force. This accordingly enables the deflector body to be restored to the stowed position using a simple configuration.

In the deflector device of the fourth aspect of the present disclosure, when the deflector body has been rotated in the stow direction from the deployed position by the external force, the deflector body is restored to the deployed position by an urging force. This accordingly enables the deflector body to be restored to the deployed position using a simple configuration.

In the deflector device of the fifth aspect of the present disclosure, a drive force transmitted to the transmission member to rotate the deflector body is larger than the external force acting from the transmission member such that the deflector body is rotated in the stow direction from the stowed position. This accordingly enables the deflector body to be rotated appropriately by the drive force.

In the deflector device of the sixth aspect of the present disclosure, the external force acting on the deflector body such that the deflector body is rotated in the stow direction from the stowed position increases in proportion to the rotation amount of the deflector body in the stow direction from the stowed position.

This thereby enables the external force acting on the deflector body such that the deflector body is rotated from the stowed position in the stow direction to be suppressed from becoming excessively large, and enables the deflector body to be rotated from the stowed position in the stow direction even with a small external force acting on the deflector body.

DETAILED DESCRIPTION

First Exemplary Embodiment

Figure 1:
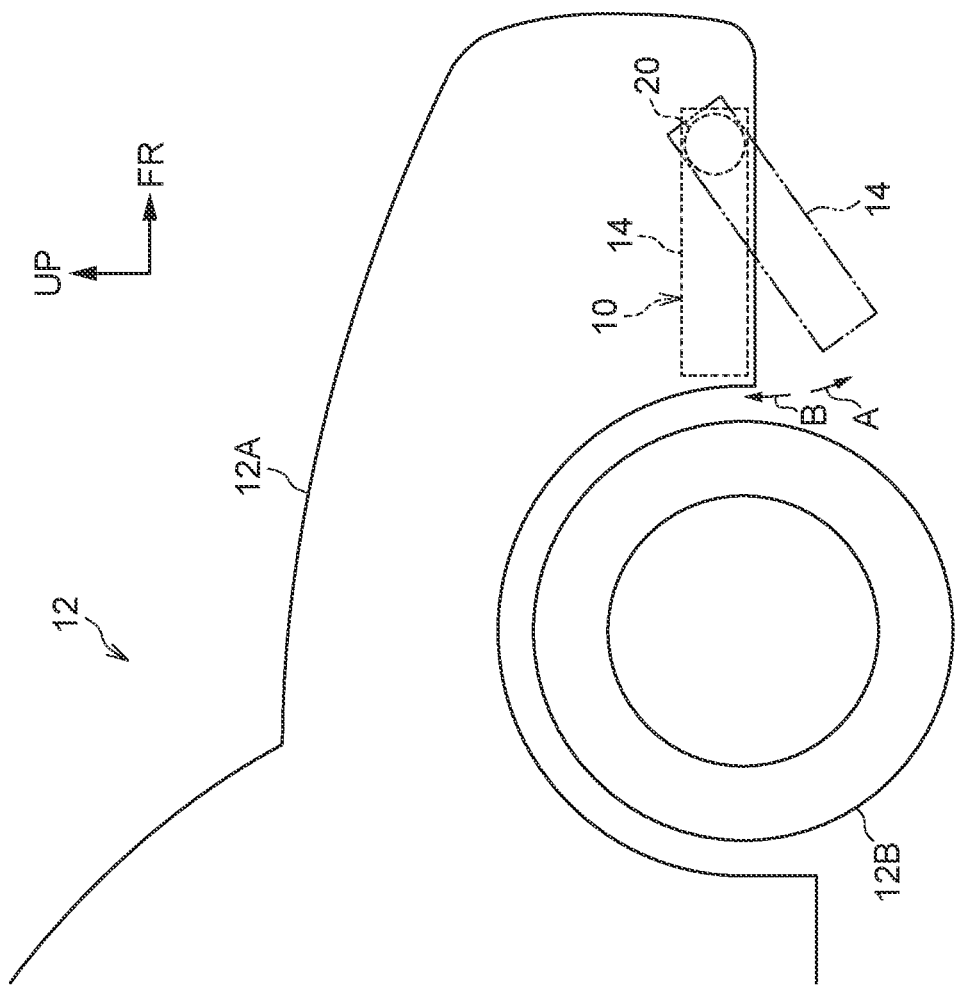
FIG. 1 is a side view illustrating a front section of a vehicle of a first exemplary embodiment of the present disclosure, as viewed from a vehicle width direction outer side.
Figure 2:
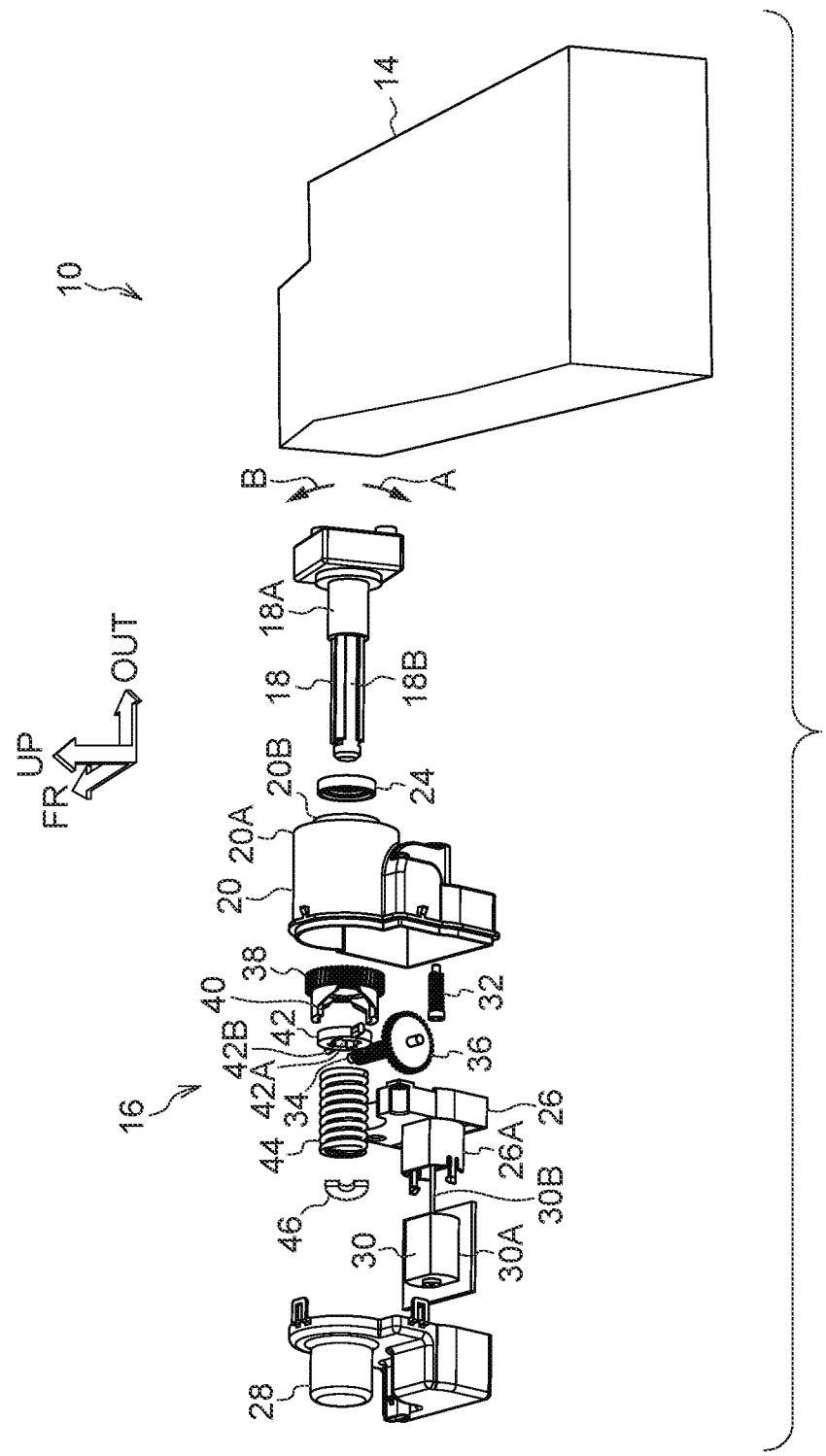
FIG. 2 is an exploded perspective view illustrating a deflector device according to the first exemplary embodiment of the present disclosure, as viewed from a vehicle rear and vehicle width direction inner side.

FIG. 1 is a side view illustrating a front section of a vehicle 12 of a first exemplary embodiment of the present disclosure, as viewed from an outer side in a vehicle width direction (vehicle right side), and FIG. 2 is an exploded perspective view illustrating a deflector device 10 according to the present exemplary embodiment, as viewed from the vehicle rear side and an inner side in the vehicle width direction. Note that in the drawings, the arrow FR indicates a vehicle front side, the arrow OUT indicates the vehicle width direction outer side (vehicle right side), and the arrow UP indicates the upper side.

As illustrated in FIG. 1, the deflector device 10 according to the present exemplary embodiment is installed inside a front end section of a vehicle body 12A, and is disposed at the front side of a front wheel 12B of the vehicle 12.

As illustrated in FIG. 1 and FIG. 2, a deflector body 14 (air spat) made from resin in a substantially cuboidal box shape is provided in the deflector device 10, and the deflector body 14 is disposed at a stowed position (the broken line position in FIG. 1).

Figure 3:
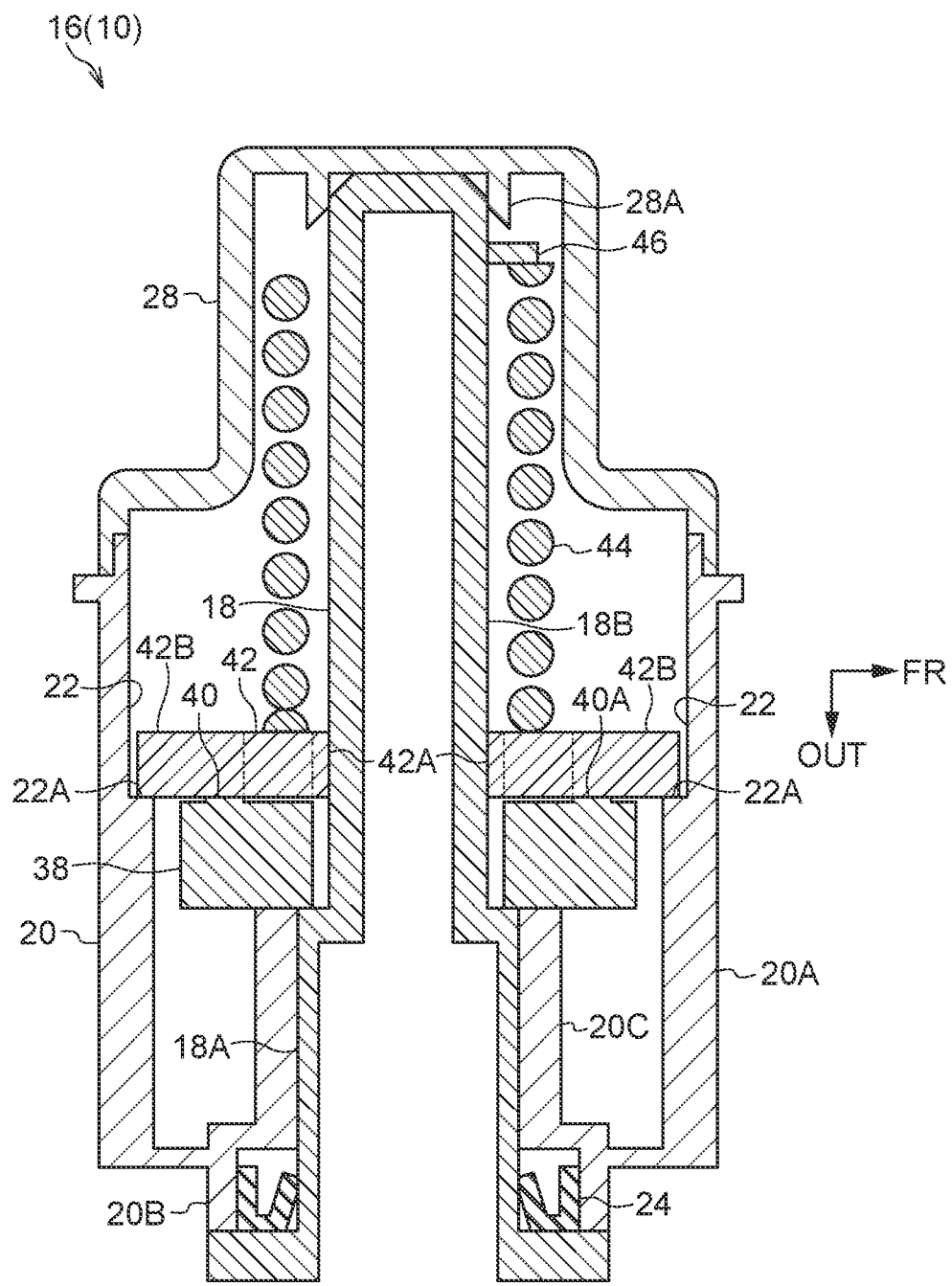
FIG. 3 is a cross-section of a drive device of a deflector device according to the first exemplary embodiment of the present disclosure, as viewed from above.
Figure 4:
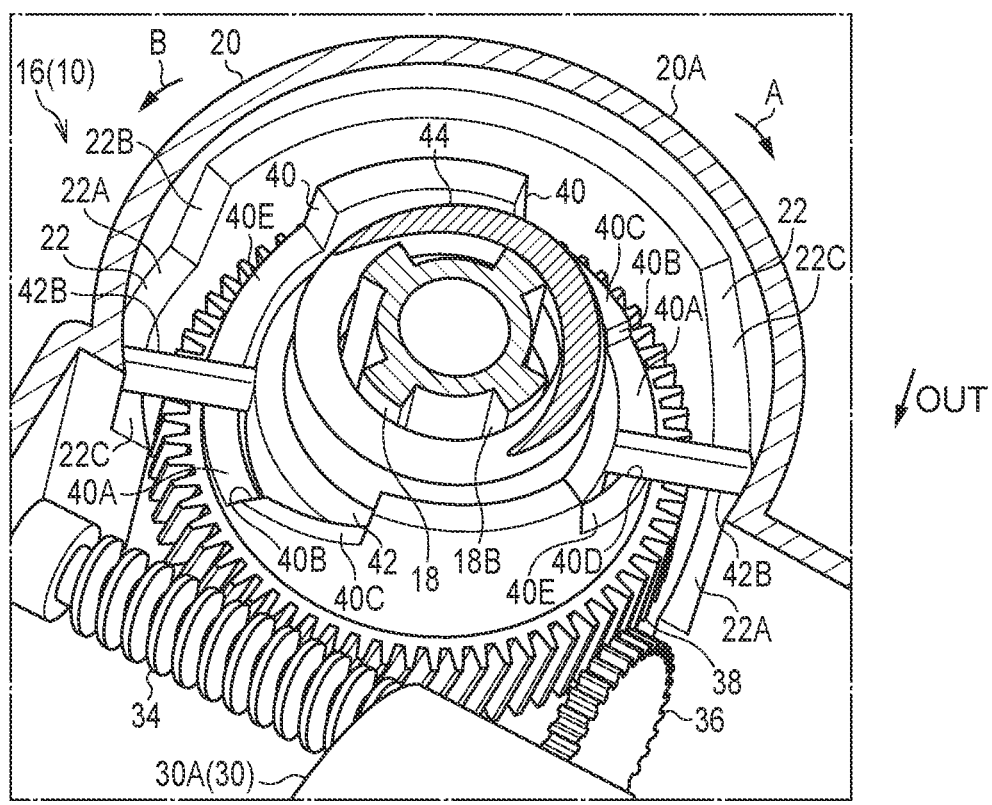
FIG. 4 is a perspective view illustrating a drive device of a deflector device according to the first exemplary embodiment of the present disclosure, as viewed from the vehicle width direction inner side.

A drive device 16 (see FIG. 3 and FIG. 4) is assembled to a vehicle width direction inner side of the deflector body 14, with the drive device 16 being fixed to the front end inside of the vehicle body 12A.

A stand 18 made from metal in a substantially circular cylinder shape and serving as a rotation shaft is provided at the drive device 16, with the stand 18 having an axial direction oriented along the vehicle width direction, and enlarged in diameter at an enlarged diameter portion 18A coaxially provided at a vehicle width direction outer side portion thereof. A vehicle width direction outer side end portion of the stand 18 is coupled to a vehicle front side end portion of the deflector body 14, such that the deflector body 14 is rotatable in both a deploy direction A and a stow direction B about the stand 18 as a center axis.

At the outer periphery of the stand 18, a specific number (four in the present exemplary embodiment) of anchor grooves 18B having substantially rectangular cross-section shape are formed at a vehicle width direction inner side of the enlarged diameter portion 18A, with the specific number of anchor grooves 18B being arranged at a uniform spacing around the circumferential direction of the stand 18. The anchor grooves 18B are curved along the circumferential direction of the stand 18 and the anchor grooves 18B extend along the axial direction of the stand 18.

A case 20 made from resin in a box shape and serving as a support member configuring a support body is provided at the vehicle width direction inner side of the stand 18, with the inside of the case 20 open toward the vehicle width direction inner side. A housing tube 20A is formed in a substantially bottomed circular cylinder shape at an upper portion of the case 20, with the housing tube 20A having an axial direction oriented in the vehicle width direction and having an interior communicated with a lower portion of the case 20 interior.

A specific number (two in the present exemplary embodiment) of limit grooves 22 formed with trapezoidal shape in side view and serving as a limiting section are formed at an inner periphery of the housing tube 20A, with the specific number of the limit grooves 22 arranged at a uniform spacing around the circumferential direction of the housing tube 20A. The limit grooves 22 are curved along the circumferential direction of the housing tube 20A and open toward the vehicle width direction inner side and radial direction inner side of the housing tube 20A. A pass face 22A is configured by an outside face in the vehicle width direction of each of the limit grooves 22, with the pass face 22A arranged orthogonally to an axial direction (vehicle width direction) of the housing tube 20A.

A deployment limit face 22B serving as a first limit section is configured by a face of each of the limit grooves 22 on the deploy direction A side, with the deployment limit face 22B arranged orthogonally to a circumferential direction of the housing tube 20A. A stow limit face 22C serving as a second limit section face is configured by a stow direction B side face of the limit groove 22, with the stow limit face 22C being inclined in a direction toward the vehicle width direction inner side on progression in the stow direction B. Note that the deployment limit face 22B should be provided at at least one of the limit grooves 22, and any of the limit grooves 22 not provided with the deployment limit face 22B may open in the deploy direction A.

A seal tube 20B formed in a bottomed circular cylinder shape and serving as a sealing section is integrally formed coaxially to a bottom wall (vehicle width direction outer side wall) of the housing tube 20A, with the axial direction of the seal tube 20B oriented in the vehicle width direction. The seal tube 20B pierces through the bottom wall of the housing tube 20A, with the inside of the seal tube 20B open toward the vehicle width direction outer side. A support tube 20C formed in a circular cylinder shape and serving as a first support section is integrally formed coaxially to a bottom wall (vehicle width direction inner side wall) of the seal tube 20B, with the support tube 20C extending from the seal tube 20B toward the vehicle width direction inner side. A diameter of the support tube 20C is smaller than a diameter of the seal tube 20B, with the inside of the support tube 20C opening toward the inside of the seal tube 20B.

The enlarged diameter portion 18A of the stand 18 is inserted coaxially inside the seal tube 20B and inside the support tube 20C, with the stand 18 thereby being coaxially inserted inside the housing tube 20A. The enlarged diameter portion 18A is fitted together with the inside of the support tube 20C, with the support tube 20C rotatably supporting the stand 18. A seal ring 24 formed in a circular ring shape and serving as a seal member is provided between the seal tube 20B and the enlarged diameter portion 18A, with the seal ring 24 made from rubber and having sealing properties. The seal ring 24 is sandwiched and elastically compressed between the seal tube 20B and the enlarged diameter portion 18A, with the seal ring 24 sealing between the case 20 and the stand 18 and limiting the ingression of water into the case 20.

A motor base 26 made from resin and serving as a retaining member is fixed to a lower side portion of the inside of the case 20. A retention tube 26A having a substantially bottomed elliptical cylinder shape is integrally formed to the motor base 26, with the retention tube 26A protruding toward the vehicle width direction inner side and having an interior open toward the vehicle width direction inner side.

A cover 28 made from resin in a box shape and serving as a covering member configuring the support body is provided at the vehicle width direction inner side of the case 20 and the motor base 26, with the inside of the cover 28 open toward the vehicle width direction outer side. A vehicle width direction inner side end portion of the case 20 is fitted and fixed to a vehicle width direction outer side end portion of the cover 28, with the cover 28 covering the vehicle width direction inner side of the case 20 and the motor base 26. A supplementary tube 28A having a circular cylinder shape and serving as a second support section is integrally formed to an upper portion of a bottom wall (vehicle width direction inner side wall) of the cover 28, with the supplementary tube 28A protruding toward the vehicle width direction outer side. A vehicle width direction inner side end portion of the stand 18 is fitted inside the supplementary tube 28A, with the supplementary tube 28A rotatably supporting the stand 18. A vehicle width direction inner side end face of the stand 18 is abutted against the bottom wall of the cover 28.

The cover 28 and the case 20 are fixed to the inside of a front end portion of the vehicle body 12A, with the deflector device 10 thereby installed inside the front end section of the vehicle body 12A.

A motor 30 serving as a drive mechanism is provided at a lower portion of a space between the case 20 and the cover 28. A body section 30A having substantially elliptical pillar shaped is provided at the motor 30, with the body section 30A fitted inside the retention tube 26A of the motor base 26 from the vehicle width direction inner side and retained thereby. An output shaft 30B extends from the body section 30A toward the vehicle width direction outer side, with the output shaft 30B piercing through the motor base 26 and extending toward the vehicle width direction outer side of the motor base 26. The motor 30 is drivable such that the output shaft 30B is rotatable.

An initial-stage worm 32 made from resin is provided at the vehicle width direction outer side of the motor 30, with a vehicle width direction outer side end portion of the initial-stage worm 32 supported by a bottom wall (vehicle width direction outer side wall) of the case 20 so as to be able to rotate. The output shaft 30B of the motor 30 is coaxially inserted into the initial-stage worm 32 from the vehicle width direction inner side, with the initial-stage worm 32 being integrally rotated together with the output shaft 30B by rotation of the output shaft 30B.

An output worm 34 made from metal is provided at an upper side of the initial-stage worm 32, with the output worm 34 rotatably supported between the bottom wall of the case 20 and the motor base 26. An initial-stage gear 36 (worm wheel) made from resin is coaxially supported at a vehicle rear side of the output worm 34, with the initial-stage gear 36 integrally rotating together with the output worm 34. The initial-stage gear 36 is meshed with the initial-stage worm 32, and the initial-stage gear 36 and the output worm 34 are integrally rotated by rotation of the initial-stage worm 32.

An output gear 38 made from metal in a substantially circular cylinder shape and serving as a drive member is provided at an upper side of the output worm 34, with the stand 18 coaxially fitted inside the output gear 38, and the output gear 38 rotatably supported by the stand 18. The output gear 38 is configured so as to be able to move in a vehicle width direction (axial direction) with respect to the stand 18, with the output gear 38 abutted against the enlarged diameter portion 18A of the stand 18 and the support tube 20C of the case 20 from the vehicle width direction inner side. The output gear 38 is meshed with the output worm 34 at a vehicle width direction outer side portion (worm wheel) thereof so as to have rotation limited thereby, and the output gear 38 is rotated by the output worm 34 being rotated.

A specific number (two in the present exemplary embodiment) of rotation grooves 40 having trapezoidal shapes in side view and serving as a rotation section are formed at vehicle width direction inner side portions of the output gear 38, with the specific number of rotation grooves 40 arranged at a uniform spacing around the circumferential direction of the output gear 38. The rotation grooves 40 are curved along the circumferential direction of the output gear 38, with the rotation grooves 40 open toward the vehicle width direction inner side and toward both sides in a radial direction of the output gear 38. A rotation face 40A is configured by a vehicle width direction outer side face of the rotation groove 40, with the rotation face 40A arranged orthogonally to the axial direction (vehicle width direction) of the output gear 38.

A deploy face 40B serving as a first rotation portion is configured by face of the rotation groove 40 further to the stow direction B side than the rotation face 40A, with the deploy face 40B inclined in a direction toward the vehicle width direction inner side on progression in the stow direction B. A deploy allowance face 40C serving as a first allowance portion is configured by a face of the rotation groove 40 further to the stow direction B side than the deploy face 40B, with the deploy allowance face 40C inclined in a direction toward the vehicle width direction inner side on progression in the stow direction B. A stow face 40D serving as a second rotation portion is configured by a face of the rotation groove 40 further to the deploy direction A side than the rotation face 40A, with the stow face 40D inclined in a direction toward the vehicle width direction inner side on progression along the deploy direction A. A stow allowance face 40E serving as a second allowance portion is configured at a face of the rotation groove 40 further to the deploy direction A side than the stow face 40D, with the stow allowance face 40E inclined in a direction toward the vehicle width direction inner side on progression along the deploy direction A.

An angle of inclination of the deploy face 40B with respect to the circumferential direction of the output gear 38 is the same as an angle of inclination of the stow face 40D with respect to the circumferential direction of the output gear 38, and an angle of inclination of the deploy allowance face 40C with respect to the circumferential direction of the output gear 38 is the same as the angle of inclination of the stow allowance face 40E with respect to the circumferential direction of the output gear 38. The angle of inclination of the deploy face 40B and the stow face 40D with respect to the circumferential direction of the output gear 38 is larger than the angle of inclination of the deploy allowance face 40C and the stow allowance face 40E with respect to the circumferential direction of the output gear 38, and the angle of inclination of each of the deploy allowance faces 40C and the stow allowance faces 40E with respect to the circumferential direction of the output gear 38 is larger than the angle of inclination of each of the stow limit faces 22C of the case 20 (limit grooves 22) with respect to the circumferential direction of the housing tube 20A.

A clutch 42 made from metal in a substantially circular ring shape and serving as a transmission member is provided at the vehicle width direction inner side of the output gear 38, with the stand 18 fitting coaxially inside the clutch 42 and the clutch 42 supported by the stand 18. A specific number (four in the present exemplary embodiment) of anchor projections 42A having a substantially rectangular pillar shape are formed protruding from an inner periphery of the clutch 42, with the specific number of the anchor projections 42A arranged at a uniform spacing around the circumferential direction of the clutch 42. The anchor projections 42A are curved along the circumferential direction of the clutch 42, with the anchor projections 42A extending along the axial direction (vehicle width direction) of the clutch 42. The anchor projections 42A are inserted into the anchor grooves 18B of the stand 18 from the vehicle width direction inner side, and the anchor projections 42A are fitted together with the anchor grooves 18B in the circumferential direction of the clutch 42. The clutch 42 is accordingly able to rotate together with the stand 18, and is also able to move along the axial direction with respect to the stand 18.

A specific number (two in the present exemplary embodiment) of arms 42B having a substantially rectangular pillar shape and serving as a transmission member are integrally formed to the outer side periphery of the clutch 42, with the specific number of arms 42B arranged at a uniform spacing around the circumferential direction of the clutch 42. The arms 42B extend toward the radial direction outer side of the clutch 42, pass through the rotation grooves 40 of the output gear 38, and both side faces in the vehicle width direction of the arms 42B are curved to form a convex shape along the circumferential direction of the clutch 42. The arms 42B abut to the rotation faces 40A of the rotation grooves 40 from the vehicle width direction inner side and are abutted by the stow faces 40D of the rotation grooves 40. Furthermore, the arms 42B are arranged in the case 20 at the vehicle width direction inner side of the pass faces 22A of the limit grooves 22 and are also abutted by the stow limit faces 22C of the limit grooves 22.

A coil spring 44 made from metal and serving as an urging member is provided at the vehicle width direction inner side of the clutch 42, with the stand 18 coaxially inserted inside the coil spring 44. A C ring 46 having a C-shaped plate shape, made from metal, and serving as an anchor member is fitted over and fixed to the stand 18 in the vicinity of a vehicle width direction inner side end thereof, with the coil spring 44 spanning between the C ring 46 and the clutch 42. The coil spring 44 is compressible in an axial direction, and the coil spring 44 urges the clutch 42 and the output gear 38 toward the vehicle width direction outer side.

Next, description follows regarding operation of the present exemplary embodiment.

In the deflector device 10 configured as described above, in order to deploy the deflector body 14, the motor 30 in the drive device 16 is driven in the forward direction and the output shaft 30B, the initial-stage worm 32, the initial-stage gear 36, and the output worm 34 are rotated thereby, with the output gear 38 accordingly rotated in the deploy direction A, and the rotation faces 40A of the rotation grooves 40 in the output gear 38 being passed (slid) over by the arms 42B of the clutch 42. The deploy faces 40B of the rotation grooves 40 are then abutted by the arms 42B, and the stand 18 is rotated in the deploy direction A (the clutch 42 transmits drive force of the motor 30 to the stand 18) by the clutch 42 being rotated in the deploy direction A, with the deflector body 14 being rotated in the deploy direction A. Furthermore, the arms 42B of the clutch 42 are passed over the pass faces 22A of the limit grooves 22 in the case 20 and are abutted by the deployment limit faces 22B of the limit grooves 22, such that rotation of the clutch 42, the stand 18, and the deflector body 14 is limited in the deploy direction A. and the deflector body 14 is disposed in the deployed position (double-dot broken line position of FIG. 1).

The deflector body 14 is thereby disposed at the lower side of the vehicle body 12A and at the vehicle front side of the front wheel 12B of the vehicle 12, suppresses travel-induced wind (airflow) of the vehicle 12 from flowing onto the front wheel 12B (travel-induced wind flowing onto a lower side of the front wheel 12B), suppresses an increase in the air pressure from occurring at the vehicle front side of the front wheel 12B, and suppresses air resistance and lifting of the vehicle 12 from occurring.

In cases in which an external force of a specific value or greater from a bump in the road of travel of the vehicle 12 acts upward (in the stow direction B) on the deflector body 14 while the deflector body 14 is disposed at the deployed position, in the drive device 16 the arms 42B of the clutch 42 at the output gear 38 are moved (slid) against the urging force of the coil spring 44 from the deploy faces 40B of the rotation grooves 40 to the deploy allowance faces 40C. The clutch 42 is allowed to rotate in the stow direction B while being moved toward the vehicle width direction inner side, and rotation of the stand 18 and the deflector body 14 in the stow direction B is allowed, and the deflector body 14 and the drive device 16 are protected against the external force.

Then when the external force acting on the deflector body 14 is released, the arms 42B of the clutch 42 are moved (slid) by the urging force of the coil spring 44 from the deploy allowance faces 40C to the deploy faces 40B of the rotation grooves 40, the clutch 42 is rotated in the deploy direction A while being moved toward the vehicle width direction outer side, the stand 18 and the deflector body 14 are accordingly rotated in the deploy direction A. and the deflector body 14 is disposed (restored) to the deployed position.

Moreover, in order to stow the deflector body 14, the motor 30 in the drive device 16 is driven in reverse, and the output shaft 30B, the initial-stage worm 32, the initial-stage gear 36, and the output worm 34 are rotated such that the output gear 38 is rotated in the stow direction B, and the rotation faces 40A of the rotation grooves 40 in the output gear 38 are passed (slid) over by the arms 42B of the clutch 42. The stow faces 40D of the rotation grooves 40 are then abutted by the arms 42B, the stand 18 is rotated in the stow direction B (the clutch 42 transmits drive force of the motor 30 to the stand 18) by the clutch 42 being rotated in the stow direction B, and the deflector body 14 is rotated in the stow direction B. Furthermore, the arms 42B of the clutch 42 are passed over the pass faces 22A of the limit grooves 22 in the case 20, and are abutted by the stow limit faces 22C of the limit grooves 22, such that the clutch 42, the stand 18, and the deflector body 14 are limited from rotating in the stow direction B, and the deflector body 14 is disposed in the stowed position (the broken line position of FIG. 1).

In cases in which an external force of a defined value or greater from a bump in the road of travel of the vehicle 12 has acted upward (in the stow direction B) on the deflector body 14 while the deflector body 14 is disposed at the stowed position, in the drive device 16 the arms 42B of the clutch 42 are moved (slid) over the stow limit faces 22C of the limit grooves 22 in the case 20 (the stowage tube 20A) against the urging force of the coil spring 44, and the clutch 42 is allowed to rotate in the stow direction B by the clutch 42 moving toward the vehicle width direction inner side, rotation of the stand 18 and the deflector body 14 in the stow direction B is allowed, and the deflector body 14 and the drive device 16 are protected against the external force.

Then when the action of external force on the deflector body 14 has been released, the arms 42B of the clutch 42 are slid (moved) against the stow limit faces 22C of the limit grooves 22 by the urging force of the coil spring 44 and the clutch 42 is rotated in the deploy direction A while being moved toward the vehicle width direction outer side, such that the stand 18 and the deflector body 14 are rotated in the deploy direction A, and the deflector body 14 is disposed (restored) to the stowed position.

In a case in which, supposing, external force of the specific value or greater has acted downward (in the deploy direction A) on the deflector body 14 while the deflector body 14 is disposed at the stowed position, at the drive device 16 the arms 42B of the clutch 42 are moved (slid) against urging force of the coil spring 44 from the stow face 40D of the rotation grooves 40 in the output gear 38 to the stow allowance face 40E thereof and the clutch 42 is allowed to rotate in the deploy direction A while being moved toward the vehicle width direction inner side, such that rotation of the stand 18 and the deflector body 14 in the deploy direction A is allowed, and the deflector body 14 and the drive device 16 are protected against the external force.

Then when the action of the external force on the deflector body 14 has been released, the arms 42B of the clutch 42 are moved (slid) from the stow allowance face 40E of the rotation grooves 40 to the stow face 40D thereof by the urging force of the coil spring 44 and the clutch 42 is rotated in the stow direction B while being moved toward the vehicle width direction outer side, the stand 18 and the deflector body 14 are rotated in the stow direction B, and the deflector body 14 is disposed (restored) to the stowed position.

When, as described above, an external force in the stow direction B has acted on the deflector body 14 while in the stowed position, the deflector body 14 is rotated in the stow direction B from the stowed position by the clutch 42 being moved in the axial direction (toward the vehicle width direction inner side) even without the stand 18 being moved in the axial direction (vehicle width direction). This enables moving of the stand 18 in the axial direction to be suppressed. A seal between the stand 18 and the case 20 can accordingly be achieved using a simple configuration and, for example, instead of sealing using the seal ring 24 between the sealing tube 20B of the case 20 and the enlarged diameter portion 18A of the stand 18, sealing may be achieved by using an oil seal or the like between the support tube 20C of the case 20 and the enlarged diameter portion 18A of the stand 18.

Furthermore, when external force in the stow direction B has acted on the deflector body 14 while in the deployed position, the deflector body 14 is rotated in the stow direction B from the deployed position by the clutch 42 being moved in the axial direction even without the stand 18 being moved in the axial direction. Moreover, when external force in the deploy direction A has acted on the deflector body 14 while in the stowed position, the deflector body 14 is rotated in the deploy direction A from the stowed position by the clutch 42 being moved in the axial direction even without the stand 18 being moved in the axial direction. This accordingly enables even better suppression of moving of the stand 18 in the axial direction.

Moreover, when the deflector body 14 is rotated by external force from the stowed position in the stow direction B, when the deflector body 14 is rotated in the stow direction B from the deployed position by external force, and when the deflector body 14 is rotated by external force from the stowed position in the deploy direction A, the deflector body 14 is rotated by the external force by the clutch 42 being moved in the axial direction against the urging force of the coil spring 44 even without the stand 18 being moved in the axial direction against urging force of the coil spring 44. This enables the deflector body 14 to be rotated even when the external force acting on the deflector body 14 is small, enabling the deflector body 14 and the drive device 16 to be appropriately protected against the external force.

Furthermore, when the deflector body 14 has been rotated by external force in the stow direction B from the stowed position, when the deflector body 14 has been rotated in the stow direction B from the deployed position by external force, and when the deflector body 14 has been rotated in the deploy direction A from the stowed position by external force, the clutch 42 is rotated by the urging force of the coil spring 44, and the deflector body 14 is restored to the stowed position or the deployed position. This means that the deflector body 14 can still be restored to the stowed position or the deployed position using a simple configuration without needing to drive the motor 30.

The angle of inclination of each of the stow limit faces 22C of the case 20 (limit groove 22) with respect to the circumferential direction of the stowage tube 20A is smaller than the angle of inclination of each of the deploy faces 40B and the stow faces 40D of the output gear 38 (rotation grooves 40) with respect to the circumferential direction of the output gear 38. Thus external force acting on the deflector body 14 such that the deflector body 14 is rotated in the stow direction B from the stowed position (external force transmitted from the arms 42B of the clutch 42 to the stow limit face 22C) is smaller than external force acting on the deflector body 14 such that the deflector body 14 is rotated in the stow direction B from the deployed position (external force transmitted from the arms 42B of the clutch 42 to the deploy face 40B). The external force acting on the deflector body 14 such that the deflector body 14 is rotated in the stow direction B from the stowed position is also smaller than external force acting on the deflector body 14 such that the deflector body 14 is rotated in the deploy direction A from the stowed position (external force transmitted from the arms 42B of the clutch 42 to the stow face 40D). Thus the deflector body 14 is able to rotate in the stow direction B from the stowed position even with a small external force acting on the deflector body 14, enabling the deflector body 14 and the drive device 16 to be appropriately protected against the external force.

Furthermore, the angle of inclination of each of the stow limit faces 22C of the case 20 (limit grooves 22) with respect to the circumferential direction of the stowage tube 20A is set constant, and the urging force of the coil spring 44 increases in proportion to the rotation amount of the deflector body 14 in the stow direction B from the stowed position. This external force acting on the deflector body 14 such that the deflector body 14 is rotated in the stow direction B from the stowed position accordingly increases in proportion to the rotation amount of the deflector body 14 in the stow direction B from the stowed position. The external force acting on the deflector body 14 such that the deflector body 14 is rotated in the stow direction B from the stowed position can accordingly be suppressed from becoming excessively large, and the deflector body 14 can be rotated in the stow direction B from the stowed position even with a small external force acting on the deflector body 14, enabling the deflector body 14 and the drive device 16 to be appropriately protected against the external force.

Moreover, the angle of inclination of each of the deploy faces 40B and the stow faces 40D of the output gear 38 (rotation groove 40) with respect to the circumferential direction of the output gear 38 is set larger than the angle of inclination of each of the stow limit faces 22C of the case 20 (limit grooves 22) with respect to the circumferential direction of the stowage tube 20A. This means that the drive force of the motor 30 transmitted via the deploy faces 40B or the stow faces 40D to the clutch 42 to rotate the deflector body 14 in the deploy direction A and in the stow direction B is larger than the external force transmitted from the clutch 42 to the stow limit face 22C such that the deflector body 14 is rotated in the stow direction B from the stowed position. The clutch 42 is accordingly able to be rotated appropriately by the drive force of the motor 30, enabling the deflector body 14 to be rotated appropriately.

Furthermore, regulation of a rotation range of the deflector body 14 under drive force of the motor 30 and allowing of rotation of the deflector body 14 under external force is performed at a position of the output gear 38 of the stand 18. Thus due to not performing regulation of the rotation range of the deflector body 14 under the drive force of the motor 30 and allowing of rotation of the deflector body 14 under external force at a position other than at the output gear 38 of the stand 18, the configuration of the drive device 16 can be simple, and the drive device 16 can be made more compact in the axial direction (vehicle width direction) of the stand 18.

Second Exemplary Embodiment

Figure 5:
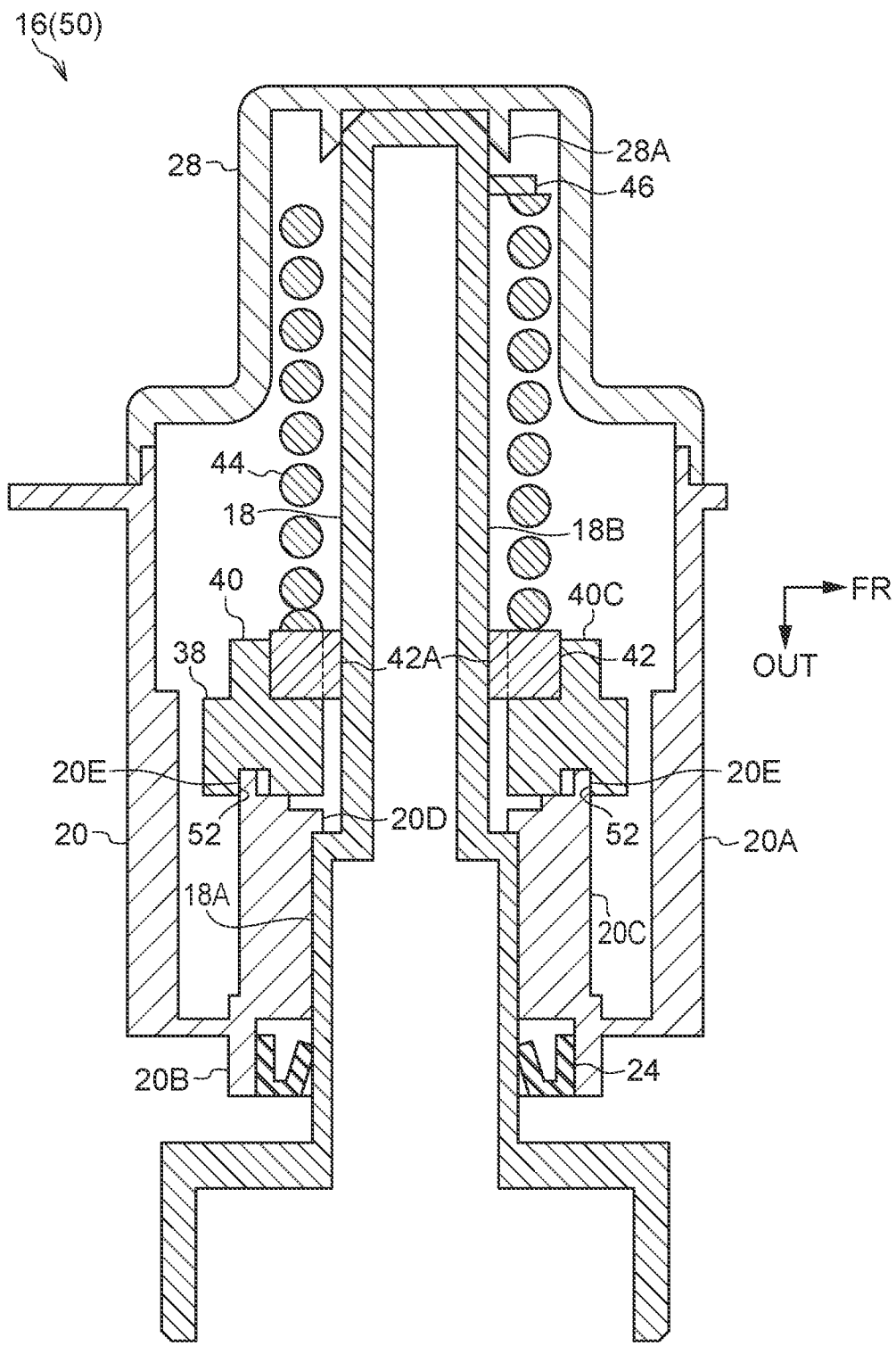
FIG. 5 is a cross-section illustrating a drive device of a deflector device according to a second exemplary embodiment of the present disclosure, as viewed from above.

FIG. 5 illustrates a cross-section of a drive device 16 of a deflector device 50 according to a second exemplary embodiment of the present disclosure, as viewed from above. Furthermore, FIG. 6 is a perspective view illustrating the drive device 16 of the deflector device 50 as viewed from the vehicle width direction outer side, and FIG. 7 is a perspective view illustrating the drive device 16 of the deflector device 50, as viewed from the vehicle width direction inner side.

The deflector device 50 according to the present exemplary embodiment has a configuration similar to that of the first exemplary embodiment, but differs in the following points.

Figure 6:
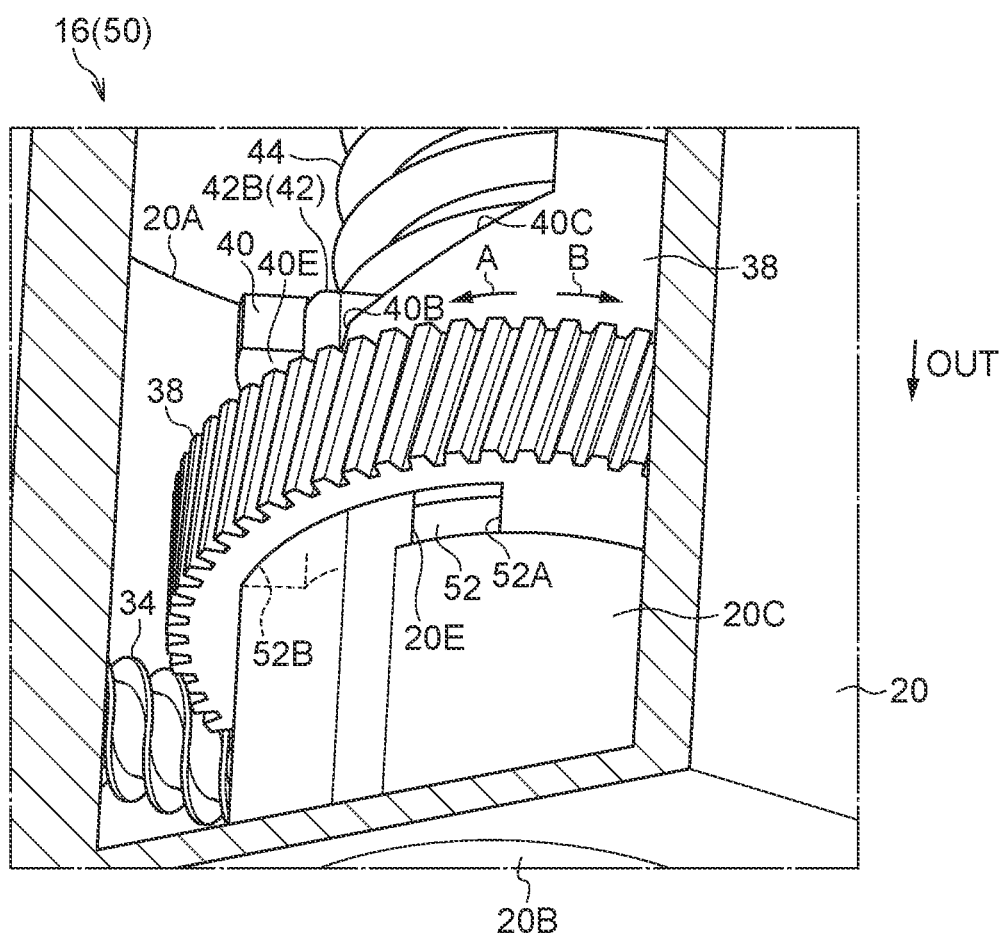
FIG. 6 is a perspective view illustrating a drive device of a deflector device according to the second exemplary embodiment of the present disclosure, as viewed from the vehicle width direction outer side.
Figure 7:
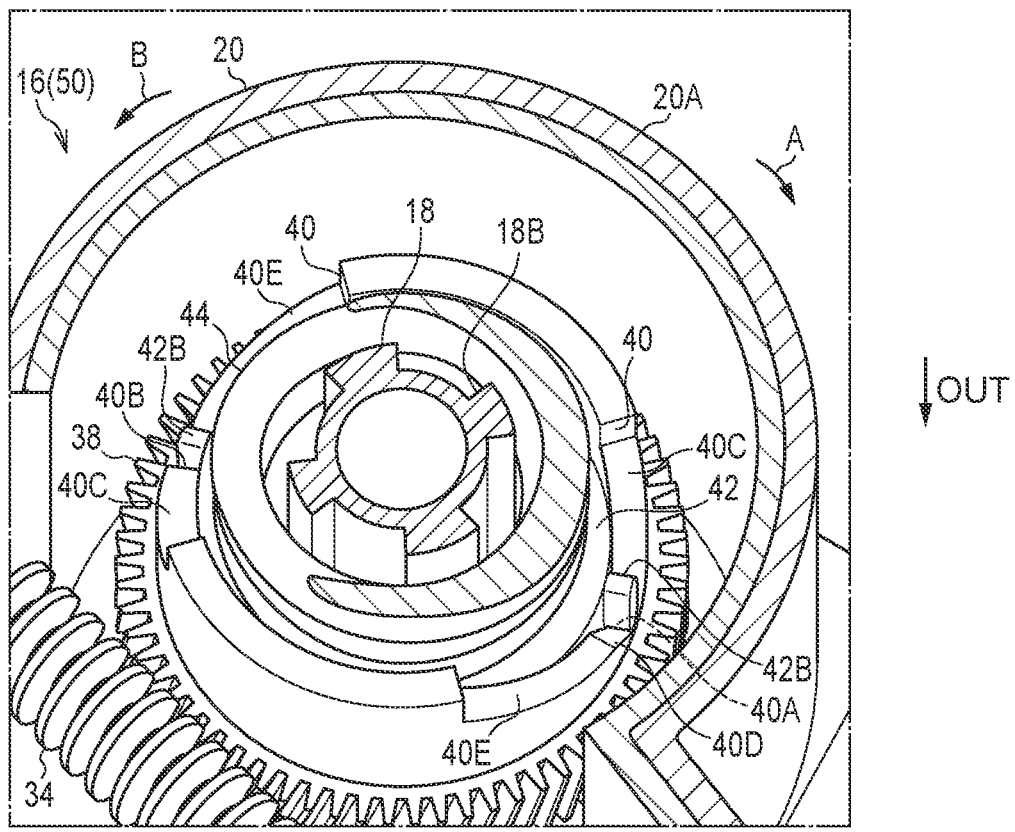
FIG. 7 is a perspective view illustrating a drive device of a deflector device according to the second exemplary embodiment of the present disclosure, as viewed from the vehicle width direction inner side.

As illustrated in FIG. 5 to FIG. 7, the limit grooves 22 of the first exemplary embodiment are not provided at the stowage tube 20A of the case 20 in the drive device 16 of the deflector device 50 according to the present exemplary embodiment.

An abutting plate 20D having a circular ring plate shape is integrally formed coaxially at an upper end portion of an inner periphery of a support tube 20C of the case 20, with the abutting plate 20D abutted against an enlarged diameter portion 18A of the stand 18 from the vehicle width direction inner side. A specific number (two in the present exemplary embodiment) of restricting plates 20E having a substantially rectangular plate shape and serving as a restricting section are integrally formed at an outer periphery of the support tube 20C, with the specific number of the restricting plates 20E arranged at a uniform spacing around the circumferential direction of the stowage tube 20A and with each respectively curved along a circumferential direction of the stowage tube 20A. The restricting plates 20E extend along the axial direction (vehicle width direction) of the support tube 20C, with the restricting plates 20E being integrated to a bottom wall of the sealing tube 20B and also protruding out to the vehicle width direction inner side of the support tube 20C.

The output gear 38 is abutted against the support tube 20C of the case 20 from the vehicle width direction inner side, and is not abutted against the enlarged diameter portion 18A of the stand 18.

A specific number (two in the present exemplary embodiment) of restriction grooves 52 having a substantially elongated rectangular shape and serving as a restricted section are formed at a vehicle width direction outer side portion of the output gear 38, with the specific number of the restriction grooves 52 arranged at a uniform spacing around the circumferential direction of the output gear 38. The restriction grooves 52 are curved along the circumferential direction of the output gear 38, and the restriction grooves 52 are open toward the vehicle width direction outer side. A deploy restriction face 52A serving as a first restricted section is configured by a face on a stow direction B side of each of the restriction grooves 52, with the deploy restriction face 52A being disposed orthogonal to a circumferential direction of the output gear 38. A stow restriction face 52B serving as a second restricted section is configured by a face on a deploy direction A side of each of the restriction grooves 52, with the stow restriction face 52B being arranged orthogonal to the circumferential direction of the output gear 38. The restricting plates 20E of the case 20 are inserted into the restriction grooves 52 from the vehicle width direction outer side, and the restricting plates 20E are abutted against the stow restriction faces 52B.

In the rotation grooves 40 of the output gear 38, a dimension of a rotation face 40A in the circumferential direction of the output gear 38 is small, and the deploy face 40B and the deploy allowance face 40C are close to the stow face 40D and the stow allowance face 40E in the circumferential direction of the output gear 38.

In the clutch 42, the extension dimension of the arms 42B is set small, and the arms 42B each abut against the rotation face 40A, the stow face 40D, and the deploy face 40B of the respective rotation groove 40.

The present exemplary embodiment is able to exhibit similar operation and advantageous effects to those of the first exemplary embodiment described above.

In particular, in order to deploy the deflector body 14, the motor 30 in the drive device 16 is driven in the forward direction and the output shaft 30B, the initial-stage worm 32, the initial-stage gear 36, and the output worm 34 are rotated such that the output gear 38 is rotated in the deploy direction A. The deploy faces 40B of the rotation grooves 40 in the output gear 38 accordingly press the arms 42B of the clutch 42, and the stand 18 is rotated in the deploy direction A (the clutch 42 transmits drive force of the motor 30 to the stand 18) by the clutch 42 being rotated in the deploy direction A, and the deflector body 14 is rotated in the deploy direction A. Furthermore, the restriction grooves 52 of the output gear 38 are rotated in the deploy direction A. and rotation of the output gear 38, the clutch 42, the stand 18, and the deflector body 14 is limited in the deploy direction A due to the deploy restriction face 52A of each of the restriction grooves 52 being abutted by the respective restricting plate 20E of the case 20, and the deflector body 14 is disposed in the deployed position (the double-dot broken line position of FIG. 1).

In a case in which, supposing, external force of the specific value or greater has acted downward (in the deploy direction A) on the deflector body 14 while the deflector body 14 is being disposed at the deployed position, then at the drive device 16 each of the arms 42B of the clutch 42 is moved (slid) against urging force of the coil spring 44 from the stow face 40D to the stow allowance face 40E of the respective rotation groove 40 in the output gear 38, and the clutch 42 is allowed to rotate along the deploy direction A by moving toward the width direction inner side, such that rotation of the stand 18 and the deflector body 14 is allowed in the deploy direction A, and the deflector body 14 and the drive device 16 are protected against the external force.

Then, when action of the external force on the deflector body 14 has been released, each of the arms 42B of the clutch 42 is moved (slid) by urging force of the coil spring 44 from the stow allowance face 40E to the stow face 40D of the respective rotation groove 40 and the clutch 42 is rotated in the stow direction B while being moved toward the vehicle width direction outer side, such that the stand 18 and the deflector body 14 are rotated in the stow direction B, and the deflector body 14 is disposed (restored) to the deployed position.

Moreover, in order to stow the deflector body 14, the motor 30 in the drive device 16 is driven in reverse, and the output shaft 30B, the initial-stage worm 32, the initial-stage gear 36, and the output worm 34 are rotated such that the output gear 38 is rotated in the stow direction B. In the output gear 38 the stow faces 40D of the rotation grooves 40 press the arms 42B of the clutch 42 and the clutch 42 is rotated in the stow direction B, and the stand 18 is rotated in the stow direction B (the clutch 42 transmits the drive force of the motor 30 to the stand 18) and the deflector body 14 is rotated in the stow direction B. Furthermore, the restriction grooves 52 of the output gear 38 are rotated in the stow direction B, and the stow restriction face 52B of each of the restriction grooves 52 is abutted against the respective restricting plate 20E of the case 20 such that rotation in the stow direction B of the output gear 38, the clutch 42, the stand 18, and the deflector body 14 is limited, and the deflector body 14 is disposed in the stowed position (broken line position of FIG. 1).

In cases in which an external force from a bump in the road of travel of the vehicle 12 of a specific value or greater has acted on the deflector body 14 upward (in the stow direction B) while the deflector body 14 is being disposed in the stowed position, in the drive device 16, the arms 42B of the clutch 42 are each moved (slid) against urging force of the coil spring 44 from the deploy face 40B to the deploy allowance face 40C of the respective rotation groove 40 in the output gear 38, and rotation of the clutch 42 toward the stow direction B is allowed by the clutch 42 moving toward the vehicle width direction inner side, such that rotation of the stand 18 and the deflector body 14 toward the stow direction B is allowed, and the deflector body 14 and the drive device 16 are protected against the external force.

Then when action of the external force on the deflector body 14 has been released, the arms 42B of the clutch 42 are each moved (slid) by urging force of the coil spring 44 from the deploy allowance face 40C to the deploy face 40B of the respective rotation groove 40, and the clutch 42 is rotated in the deploy direction A while being moved toward the vehicle width direction outer side, such that the stand 18 and the deflector body 14 are rotated in the deploy direction A, and the deflector body 14 is disposed (restored) to the stowed position.

Moreover, the limit grooves 22 are not provided at the stowage tube 20A of the case 20 at the periphery of the stand 18. This enables a simple configuration to be adopted at the periphery of the stand 18 of the drive device 16, and enables the drive device 16 to be made more compact in the radial direction of the stand 18.

Note that in the first exemplary embodiment and the second exemplary embodiment there are two each provided for the limit grooves 22 of the case 20, the rotation grooves 40 of the output gear 38, and the arms 42B of the clutch 42. However, one or three or more (for example three or four) may be provided for each of the limit grooves 22 of the case 20, the rotation grooves 40 of the output gear 38, and the arms 42B of the clutch 42.

What is claimed is:

1. A deflector device, comprising:
    a deflector body configured to be deployed in front of a front wheel of a vehicle by being rotated in a deploy direction and to suppress airflow onto the front wheel, and configured to be stowed in a body of the vehicle by being rotated in a stow direction;
    a rotation shaft configured to rotate the deflector body by rotation of the rotation shaft; and
    a transmission member configured to transmit drive force to the rotation shaft to rotate the rotation shaft, and to be moved, when an external force has acted on the deflector body such that the deflector body is rotated in the stow direction from a stowed position, by movement of the rotation shaft in an axial direction being limited.

2. The deflector device of claim 1, wherein the external force acting on the deflector body such that the deflector body is rotated in the stow direction from the stowed position is smaller than an external force acting on the deflector body such that the deflector body is rotated in the stow direction from a deployed position.

3. The deflector device of claim 1, wherein the deflector body is restored to the stowed position by an urging force when the deflector body has been rotated in the stow direction from the stowed position by the external force.

4. The deflector device of claim 1, wherein the deflector body is restored to the deployed position by an urging force when the deflector body has been rotated in the stow direction from the deployed position by the external force.

5. The deflector device of claim 1, wherein a drive force transmitted to the transmission member to rotate the deflector body is larger than the external force transmitted from the transmission member such that the deflector body is rotated in the stow direction from the stowed position.

6. The deflector device of claim 1, wherein the external force acting on the deflector body such that the deflector body is rotated in the stow direction from the stowed position increases in proportion to a rotation amount of the deflector body in the stow direction from the stowed position.

7. A deflector device, comprising:
- a deflector body configured to be deployed in a deploy direction in front of a front wheel of a vehicle by being rotated in a deploy direction and to suppress airflow onto the front wheel, and configured to be stowed in a body of the vehicle by being rotated in a stow direction;
- a rotation shaft configured to be rotated by drive force and to rotate the deflector body in the deploy direction and in the stow direction; and
- a transmission member configured to be rotatable together with the rotation shaft and to transmit drive force to the rotation shaft and to rotate the rotation shaft, the transmission member being rotated in a circumferential direction of the rotation shaft by an external force acting on the deflector body and rotating the rotation shaft together, such that the deflector body is rotated in the stow direction from the stowed position, or the deflector body is rotated in the stow direction from the deployed position.

8. The deflector device of claim 7, wherein an external force acting on the deflector body in a case in which the deflector body is rotated in the stow direction from the stowed position is smaller than an external force acting on the deflector body in a case in which the deflector body is rotated in the stow direction from the deployed position.

9. The deflector device of claim 7, wherein a drive force transmitted to the rotation shaft from the transmission member to rotate the deflector body is larger than an external force that acts on the deflector body such that the deflector body is rotated in the stow direction from the stowed position or such that the deflector body is rotated in the stow direction from the deployed position.

* * * * *